(12) United States Patent
Newman (10) Patent No.: US 10,065,580 B1
(45) Date of Patent: *Sep. 4, 2018

(54) EXTRUSION CORNER PIECE

(71) Applicant: Rick L. Newman, Edwardsburg, MI (US)

(72) Inventor: Rick L. Newman, Edwardsburg, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 15/873,401

(22) Filed: Jan. 17, 2018

Related U.S. Application Data (63) Continuation-in-part of application No. 15/438,845, filed on Feb. 22, 2017, now Pat. No. 9,889,803.

(51) Int. Cl.
| | |
|---|---|
| *B60R 13/06* | (2006.01) |
| *B62D 29/00* | (2006.01) |
| *B62D 25/02* | (2006.01) |
| *B62D 25/24* | (2006.01) |
| *B62D 27/06* | (2006.01) |
| *B60P 3/34* | (2006.01) |

(52) U.S. Cl.
CPC .............. *B60R 13/06* (2013.01); *B62D 25/02* (2013.01); *B62D 25/24* (2013.01); *B62D 27/065* (2013.01); *B62D 29/008* (2013.01); *B60P 3/34* (2013.01)

(58) Field of Classification Search
CPC .. B60J 10/00; E06B 1/34; E06B 1/342; E06B 1/56; E06B 2001/622; E06B 1/62; E06B 1/68; E04F 11/163; E04F 13/06; E04F 13/0733; E04F 19/02; E04F 2013/063; B60R 13/06; B62D 27/065; B62D 25/24; B62D 29/008; B60P 3/34
See application file for complete search history.

(56) References Cited

U.S. PATENT DOCUMENTS

| | | | | |
|---|---|---|---|---|
| 3,728,833 A | * | 4/1973 | Grossman | B60J 1/007 52/211 |
| 4,570,406 A | * | 2/1986 | DiFazio | E04C 2/384 160/381 |
| 4,608,800 A | * | 9/1986 | Fredette | E04F 13/0803 52/211 |
| 5,921,056 A | * | 7/1999 | Weiss | E06B 1/62 52/212 |
| 6,119,416 A | * | 9/2000 | Larson | E06B 1/62 49/504 |
| 6,141,926 A | * | 11/2000 | Rossiter | E04L 32/7425 160/135 |
| 7,600,355 B1 | * | 10/2009 | Klein | E04F 19/02 403/401 |

(Continued)

*Primary Examiner* — Adriana Figueroa
*Assistant Examiner* — Jessie T Fonseca
(74) *Attorney, Agent, or Firm* — Botkin & Hall, LLP (57) ABSTRACT

A flange corner piece is provided that is used to provide decoration and sealing to the perimeter of a slide-out room. The slide-out room has an outside wall with a perimeter edge. Elongate extrusions are attached to the perimeter. The extrusions have terminal ends that are located proximate corners on the outside wall. Terminal ends of the extrusions are received by first and second receiving pockets in the flange corner piece. The receiving pockets are made up of walls that overlay portions of the extrusions and constrain it. The first and second receiving pockets affix neighboring extrusions and conceal the corners of the slide-out room.

10 Claims, 9 Drawing Sheets

(56) References Cited

U.S. PATENT DOCUMENTS

| | | | | |
|---|---|---|---|---|
| 8,322,091 | B2* | 12/2012 | Smith | B60J 1/007 |
| | | | | 49/501 |
| 8,443,554 | B1* | 5/2013 | Teodorovich | E06L 31/702 |
| | | | | 49/506 |
| 9,611,688 | B1* | 4/2017 | Vanderbent, Jr. | E06B 3/9644 |
| 2008/0034702 | A1* | 2/2008 | Garries | E06B 3/9641 |
| | | | | 52/656.2 |
| 2009/0272045 | A1* | 11/2009 | Teodorovich | E06L 31/702 |
| | | | | 52/58 |
| 2011/0252736 | A1* | 10/2011 | Bailey | E04L 39/0478 |
| | | | | 52/506.07 |
| 2012/0032406 | A1* | 2/2012 | Ksiezopolski | B60J 10/00 |
| | | | | 277/648 |
| 2012/0144761 | A1* | 6/2012 | Teodorovich | E06L 31/702 |
| | | | | 52/62 |

* cited by examiner

EXTRUSION CORNER PIECE

CROSS REFERENCE TO RELATED APPLICATIONS

This application is a continuation-in-part which claims the benefit of U.S. Utility application Ser. No. 15/438,845 filed Feb. 22, 2017, the disclosures of which are hereby incorporated by reference.

BACKGROUND OF THE INVENTION

This present disclosure relates to slide-out rooms, particularly the trim flange that goes around the outside wall of the slide-out. Slide-out rooms reside in an opening in the side wall of an RV, trailer, or other mobile living quarters. The slide-out room provides additional living or storage space when the RV is parked without increasing the overall footprint of the vehicle. The slide-out room must be properly sealed from the outside elements, whether it is in the extended position or the retracted position. Typically, the room is sealed with a face seal that goes around the perimeter of the opening in the sidewall, along with wiper seals that slide on the sidewalls of the room as the room moves in or out. In order to have a mating surface for the face seal, a flange is attached to the perimeter of the outside wall of the slide-out room. Currently this is accomplished through a long extrusion with mitered corners that is attached to the slide-out room. The corners are subsequently covered up and protected with decorative trim pieces. Mitering corners on a room that can be quite large requires precision measurement and attachment to the room. A high level of skill is required. Cutting the extrusion too short or too long results in poor fitment, leaks, and bad aesthetics. Further, the trim pieces are held in with screws that require drilling and tapping to be properly attached to the extrusion. The screws must be no longer than the thickness of the extrusion and trim piece, as any part that extends too far could damage the seal, side wall, or prevent proper closure of the slide-out room. Due to the extreme time pressure when manufacturing an RV, an improved flange system is needed.

SUMMARY OF THE INVENTION

The present disclosure describes a flange system that utilizes corner pieces that receive an extrusion and conceal the end of it. The corner piece allows the extrusion to be cut squarely with a wide tolerance band where the corner piece can still fit and perform its function. The corner piece is held to the slide-out room with the extrusion, so no external fasteners are needed. Each corner piece has two channels, each cannel receives the end of the extrusion. The channels are fixed at ninety degrees to locate and align the extrusions.

BRIEF DESCRIPTION OF THE DRAWINGS

A preferred embodiment of this invention has been chosen wherein.

DESCRIPTION OF THE PREFERRED EMBODIMENT

Figures 1, 2:
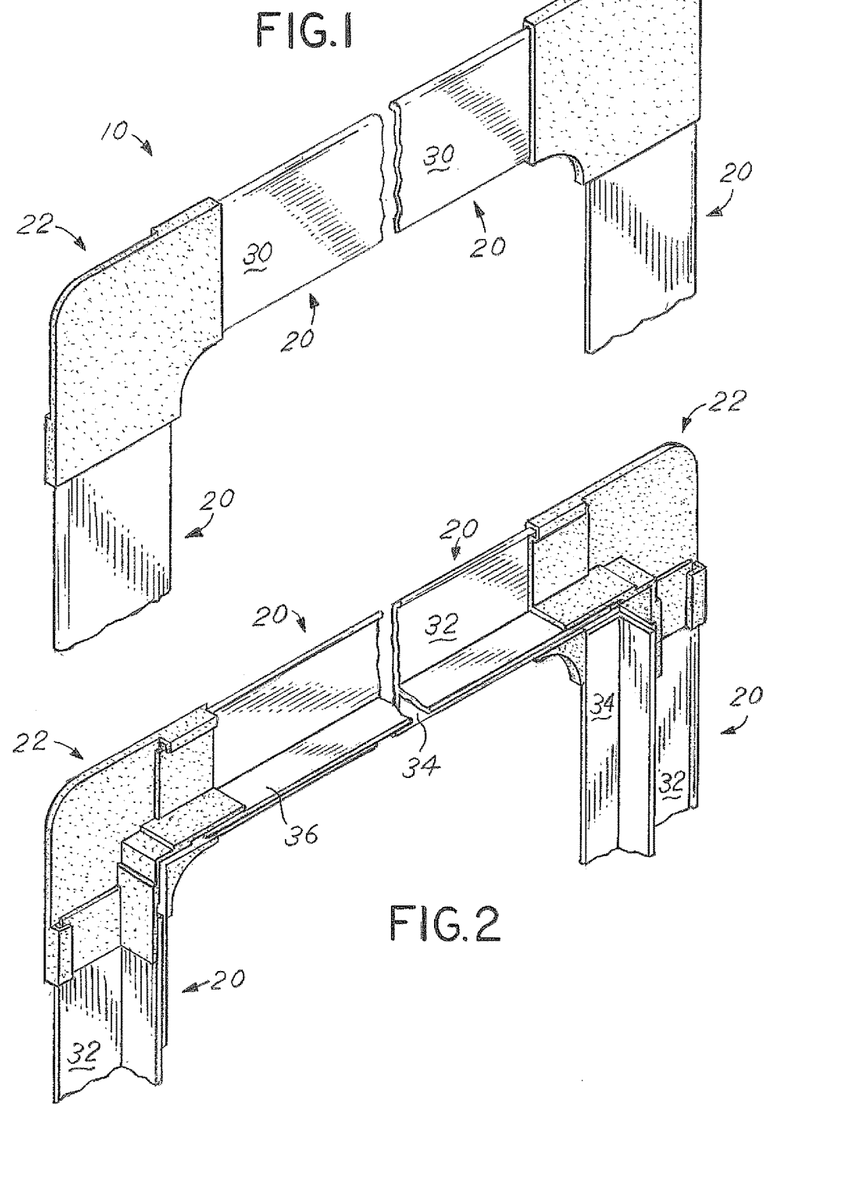
FIG. 1 is a front isometric view of the system.
FIG. 2 is a rear isometric view of the system.
Figure 6:
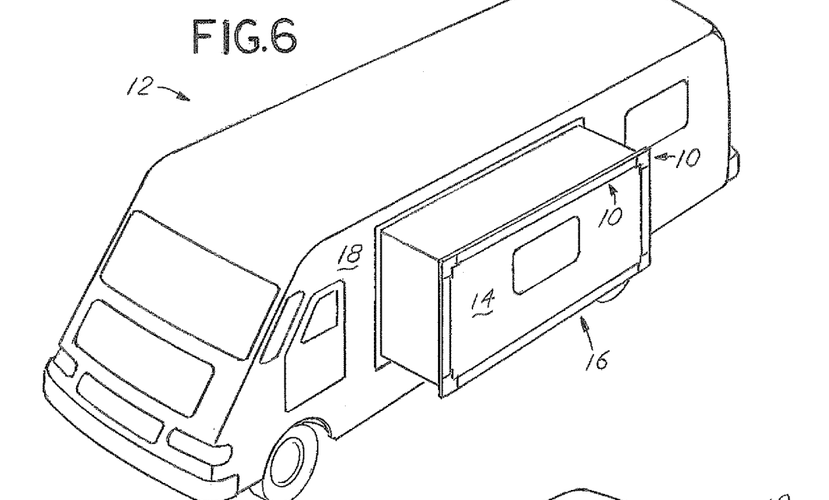
FIG. 6 is a front perspective view of the system as installed on an RV with the slide-out room in the extended position.
Figure 7:
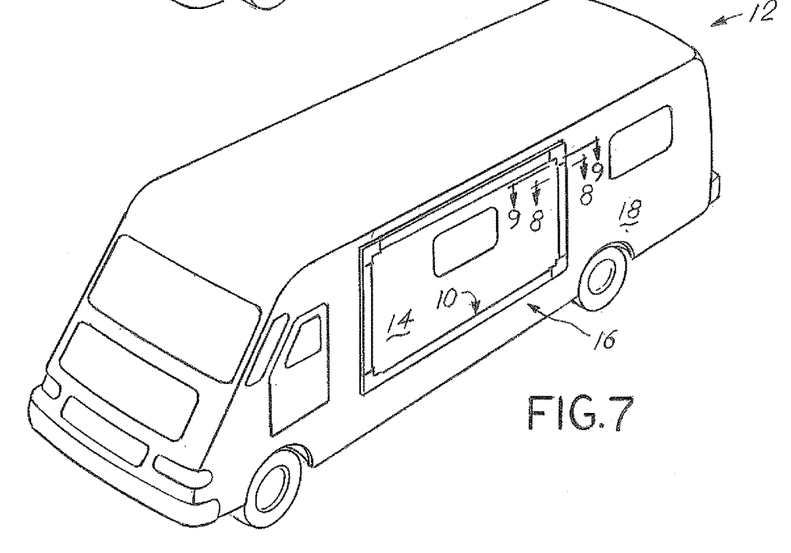
FIG. 7 is a front perspective view of the system as installed on an RV with the slide-out room in the retracted position.

A flange system 10 is shown in FIGS. 1 and 2. The flange system 10 is designed to be affixed to an RV 12, shown in FIGS. 6 and 7, specifically on the outside surface 14 of a slide-out room 16. As is well-known in the art, recreational vehicles, travel trailers, and other mobile living quarters frequently have slide-out rooms 16 to increase living area without increasing the footprint of the vehicle during transport. The slide-out room 16 is received in an aperture in a main wall 18 of the RV 12 and moves between an extended position as shown in FIG. 6 and a retracted position as shown in FIG. 7. The flange system 10 attaches to the perimeter of the outside surface 14 to conceal the gap between the room 16 and the main wall 18 and provide sealing when the room 16 is in the retracted position.

The flange system 10 is comprised of elongate extrusions 20 that are mated to flange corners 22. The RV 12, as shown, has elongate extrusions 20 and flange corners 22 that form a continuous perimeter, but it is also common for the RV 12 to have three or fewer where only a partial perimeter is formed. The elongate extrusions 20, as shown, are common elongate aluminum extrusions. The flange system 10 serves several purposes. First, it provides a decorative trim that conceals the gap between the room 16 and the main wall 18. Second, it provides a sealing surface when the room 16 is in the retracted position as shown in FIG. 6.

Figure 8:
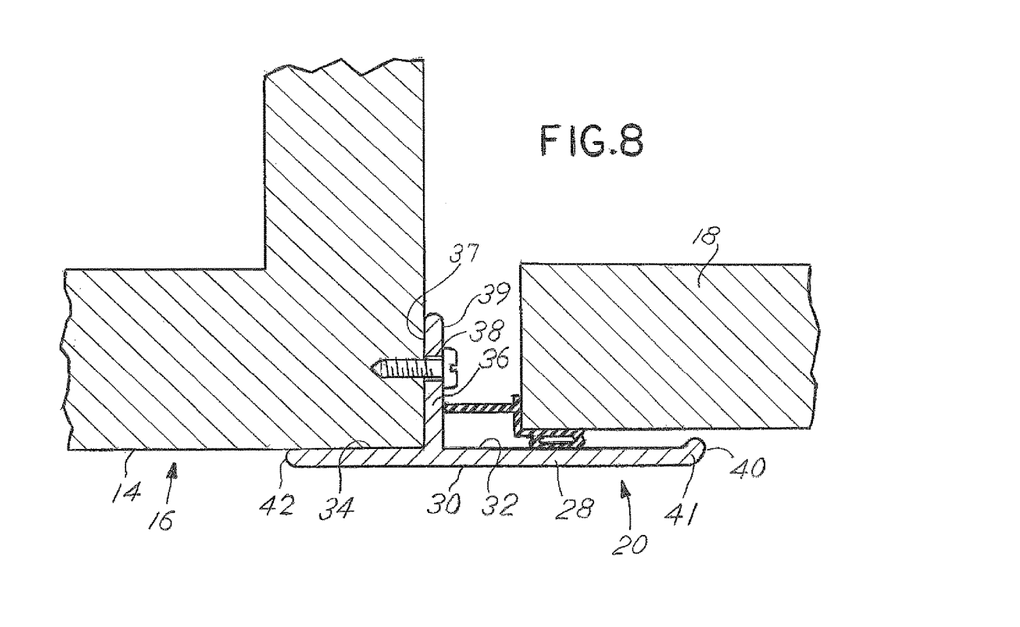
FIG. 8 is a section view taken about the line 8-8 in FIG. 7 of the system as installed on an RV.
Figure 9:
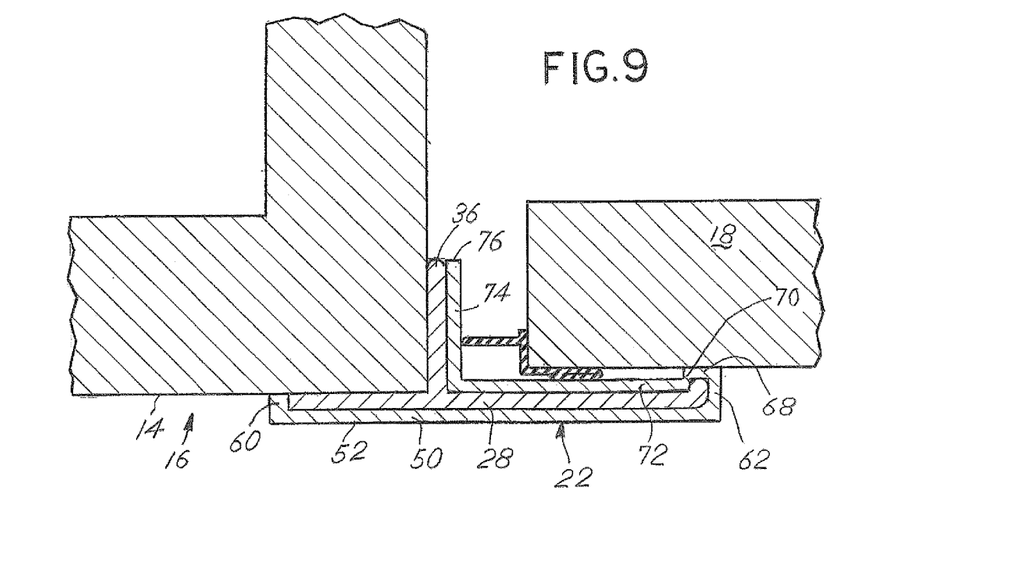
FIG. 9 is a section view taken about the line 9-9 in FIG. 7 of the system as installed on an RV.

The elongate extrusions 20 have an outside wall 28 with an outside facing surface 30 and inside facing surfaces. The inside facing surface is separated into a sealing surface 32 and an overlaying surface 34 by a mounting wall 36. The mounting wall 36 is perpendicular to the outside wall 28 and has mounting holes 38, as shown in FIG. 8. The mounting wall 36 has a room facing surface 37 and an oppositely located surface 39. The outside wall 28 has a lip 41 located on an outside lateral edge 40 and an oppositely located inside lateral edge 42. The elongate extrusions 20 as shown are common aluminum extrusion, but other materials and manufacturing processes are contemplated. The elongate extrusions 20 have a consistent cross-sectional shape along their length. The cross-section profile of the elongate extrusion 20 is shown in FIG. 8. Terminal ends 24 of the elongate extrusions 20 are identical to the section shown in FIG. 8.

Figure 3:
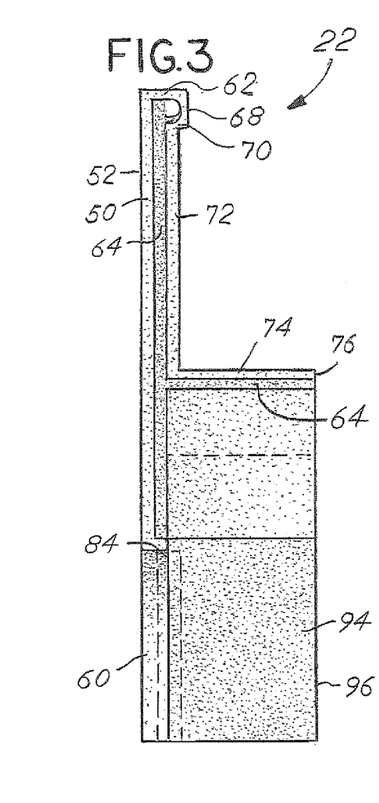
FIG. 3 is a side view of the corner piece.
Figure 4:
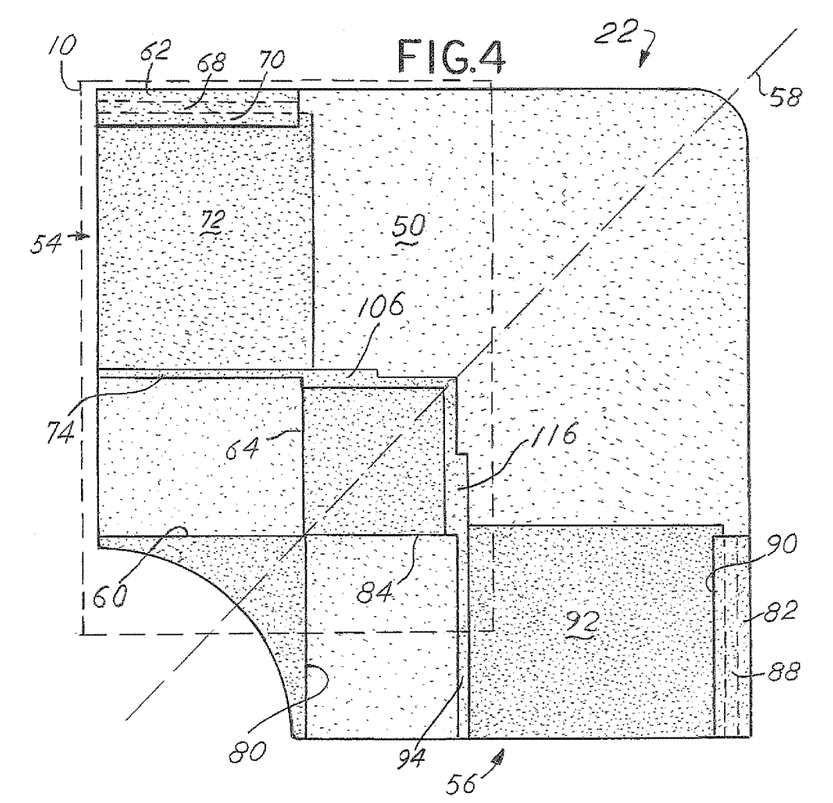
FIG. 4 is a rear view of the corner piece.
Figure 5:
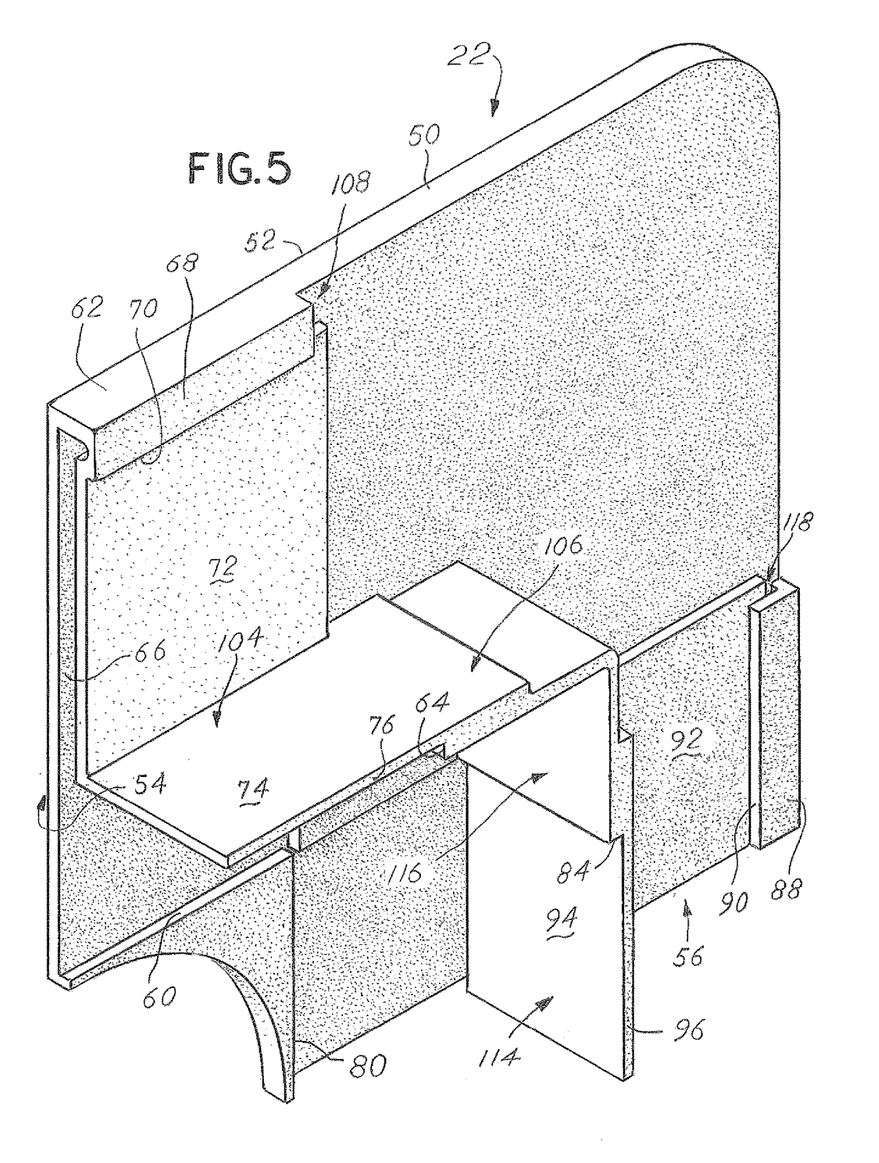
FIG. 5 is a rear isometric view of the corner piece.
Figure 10:
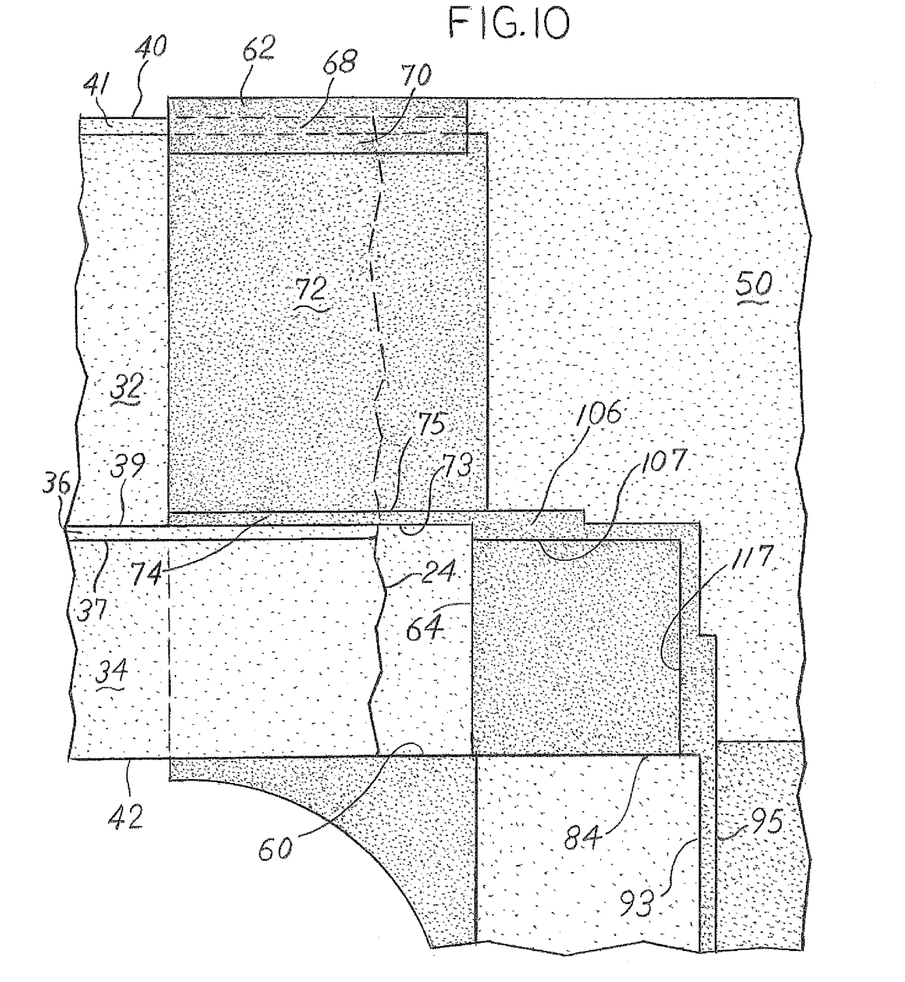
FIG. 10 is a partial view 10 of the corner piece in FIG. 4.

The flange corners 22 have a planar base wall 50 with an outside facing surface 52. A portion of the base wall 50 is a bridge portion 51 that is located between the receiving pockets 54, 56 and is shown as a large planar area in FIG. 5 that is thicker than the base wall 50 that is located in the receiving pockets 54, 56. The flange corners 22 are mirror symmetrical about a plane 58 with first and second receiving pockets 54, 56 that receive and fix the terminal ends 24 of the elongate extrusions 20. The plane 58 is perpendicular to the outside facing surface 52. The receiving pockets 54, 56 are orthogonally angled with respect to each other. As shown in FIG. 5, the first receiving pocket 54 has an inner lateral boundary wall 60 and an outer lateral boundary wall 62 that extends away from the outside facing surface 52. The first receiving pocket 54 has a mouth 66 and terminates at a first end surface 64 which serves as a stop for the terminal end 24 of the elongate extrusions 20. A portion of the end surface 64 is located in the receiving pocket 54 and extends toward the lateral boundary wall 60 between the planar base wall 50 and a retaining wall 72. As shown in FIG. 5, the end surface 64 extends onto the corner wall 74. FIG. 3 shows how the end surface 64 extends onto the corner wall 74. The outer lateral boundary wall 62 is perpendicular to the base wall 50 and extends to a relatively narrow step wall 68 that is parallel to the planar base wall 50. As shown in FIG. 3, the step wall 68 extends to a knee wall 70 that is parallel to the outer lateral boundary wall 62. The knee wall 70 extends into the retaining wall 72 that is spaced from and parallel to the base wall 50. A corner wall 74 extends perpendicularly from the retaining wall 72 and terminates at a lateral edge 76. The corner wall 74 has inside facing surface 73 and an oppositely located outside facing surface 75, shown in FIG. 10. The second receiving pocket 56 has an inner lateral boundary wall 80 and an outer lateral boundary wall 82 that extends away from the outside facing surface 52. The second receiving pocket 56 has a mouth 86 and terminates at a second end surface 84 which extends between the planar base wall 50 and a retaining wall 92. A portion of the end surface 84 is located in the receiving pocket 56 and extends toward the lateral boundary wall 60 between the planar base wall 50 and a retaining wall 92. As shown in FIG. 5, the end surface 84 extends to the corner wall 94. The outer lateral boundary wall 82 is perpendicular to the base wall 50 and extends to a relatively narrow step wall 88 that is parallel to the planar base wall 50. The step wall 88 extends to a knee wall 90 that is parallel to the outer lateral boundary wall 82. The knee wall 90 extends into the retaining wall 92 that is spaced from and parallel to the base wall 50. A corner wall 94 extends perpendicularly from the retaining wall 92 and terminates at a lateral edge 96. The corner wall 94 has inside facing surface 93 and an oppositely located outside facing surface 95, shown in FIG. 10.

The corner walls 74, 94 have a thinned area 104, 114 that is made to overlay the mounting wall 36. The thinned area 104, 114 transitions to a thick area 106, 116 at the end surface 64, 84, as is visible in FIG. 5. The thick area 106 has an inside facing surface 107 that is coplanar with the room facing surface 37 when the elongate extrusion 20 is inserted into receiving pocket 54. Similarly, the thick area 116 has an inside facing surface 117 that is coplanar with the room facing surface 37 when the elongate extrusion 20 is inserted into receiving pocket 56. The thickness of the thinned area 104, 114 and the mounting wall 36 is substantially equal to the thickness of the thick area 106, 116, to ensure the room facing surface 37 and corner walls 74, 94 form a continuous surface to mate with the side walls of the slide-out room 16.

Apertures 108, 118 are located at the end of the outer lateral boundary walls 62, 82. The apertures 108, 118 allow liquids such as water to drain out and prevent it from becoming trapped, where freezing can cause parts to be distorted or broken.

Figure 11:
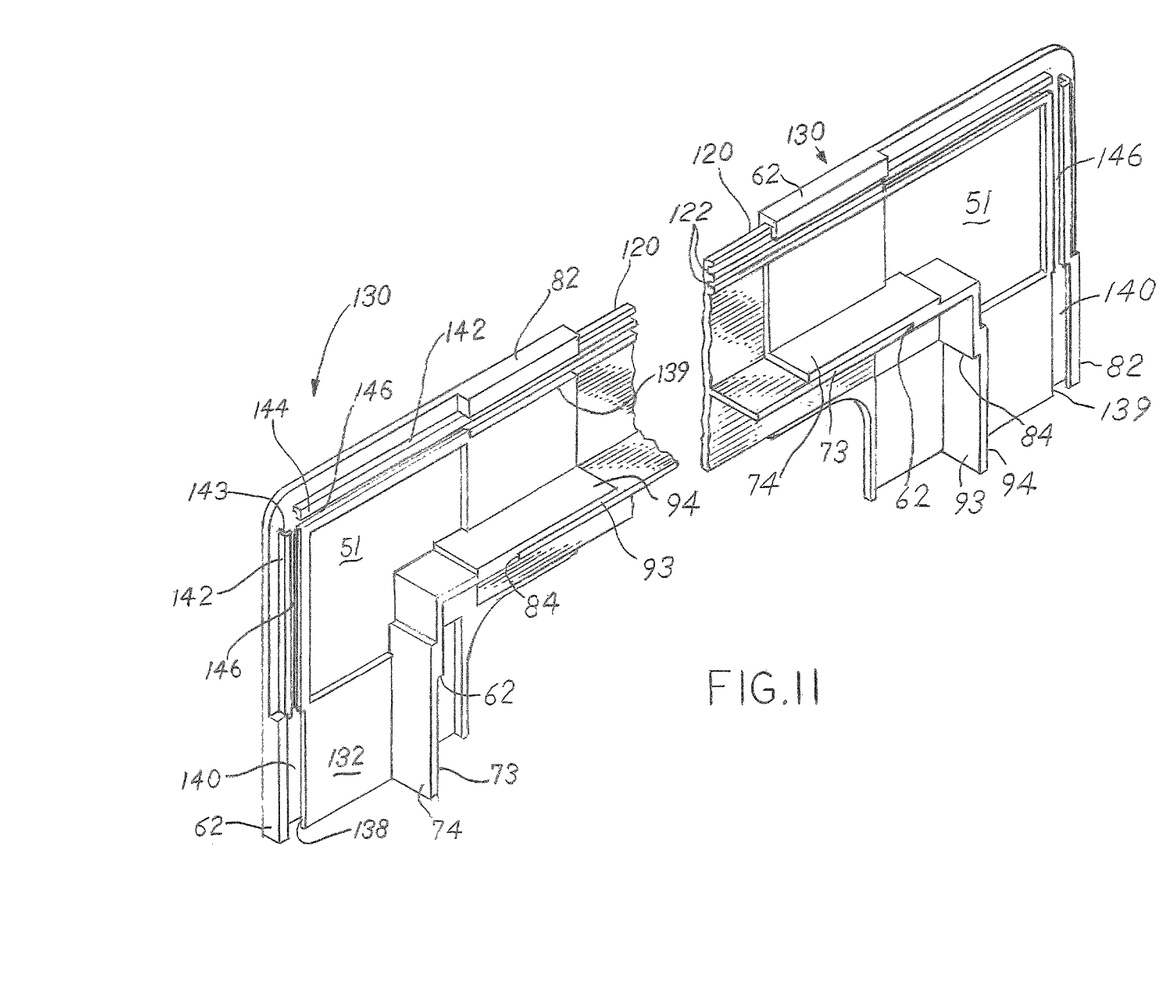
FIG. 11 is an isometric view of the system including a slot adapted for accepting extrusions having a bulb slot within the extrusion.
Figure 12:
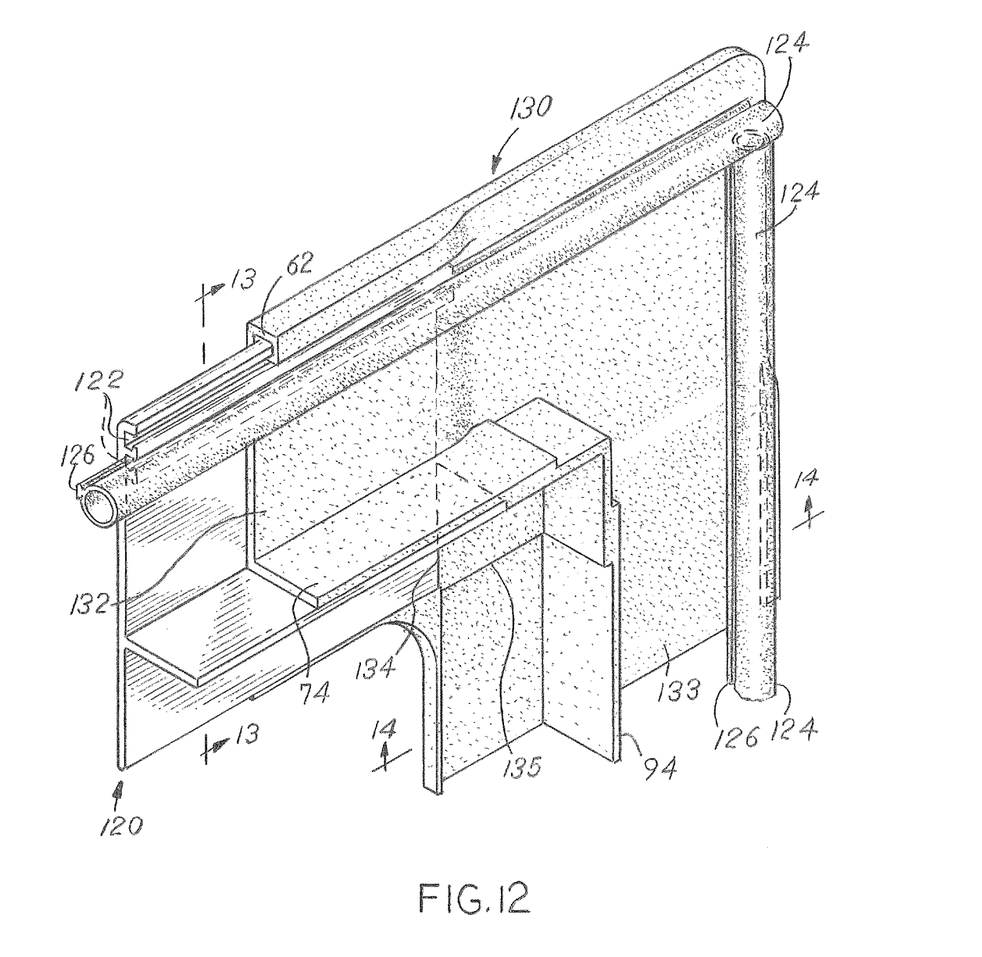
FIG. 12 is an isometric view of the corner piece shown in FIG. 11.
Figure 13:
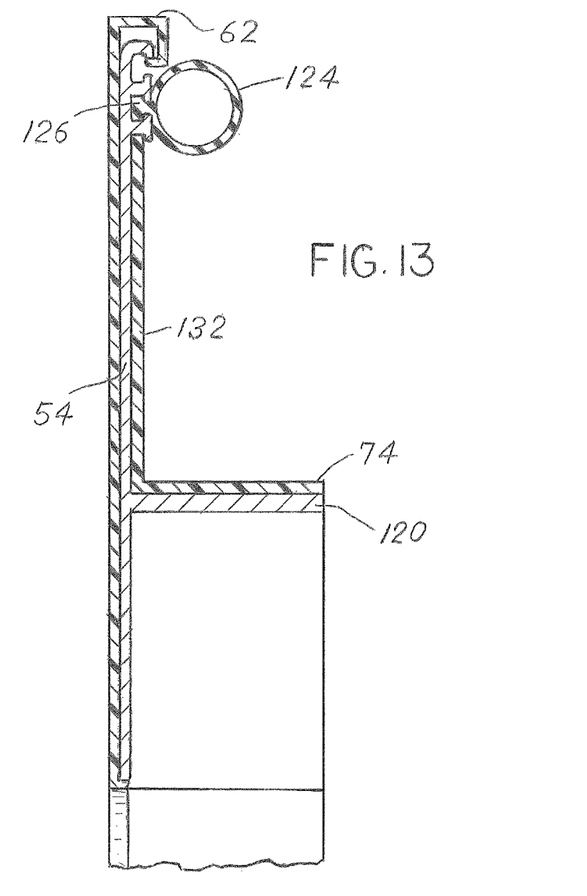
FIG. 13 is a section view taken about the line 13-13 in FIG. 12.
Figure 14:
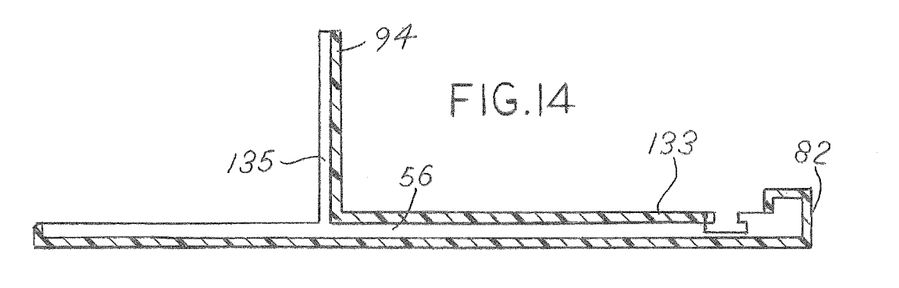
FIG. 14 is a section view taken about the line 14-14 in FIG. 13.

In some instances the elongate extrusions 120 have grooves 122 that can be used to accept bulb seals 124. The bulb seals 124 help the extrusions 120 seal to the RV. The bulb seals 124 each have a tongue 126 that is received into a corresponding groove 122 in the extrusions 120. In the case that extrusions 120 having grooves 122 are used, corners 130 are used as shown in FIGS. 11-14. Corners 130 are similar to corners 22 shown in FIGS. 1-10. Corners 130 have retaining walls 132, 133 that are opposite the base wall 50. The retaining walls 132, 133 extend from their corresponding inside facing surfaces 73, 93 of the corner walls 74, 94 to outer lateral edges 138, 139. The outer lateral edges 138, 139 define the outer lateral terminal edges at which each retaining wall 132, 133 ends. The outside lateral edges 138, 139 of the retaining walls 132, 133 are not connected to their corresponding outer lateral boundary wall 62, 82 as shown in FIG. 11. The space between the lateral edges 138, 139 and the corresponding adjacent outer lateral boundary walls 62, 82 define grooves 140 within the corner 130 itself that is adapted to accept the grooves 122 of the extrusion as well as make room for the bulb seal 124 that is inserted within its corresponding groove 122 of the extrusion 120. The corner 130 includes a second groove 146 that extends beyond the first groove 140. The second groove 146 is defined by L-shaped tabs 142 extending from the base wall 50 that have an upright portion 143 and an overhanging portion 144. The second groove 146 is for directly engaging the tongues 126 of the seals 124 directly. The ends of the extrusions 120 rest on the end surfaces 64, 84 and the second grooves 146 of the corner 130 support the bulb seals 124 that extend beyond the extrusion 120. Because each corner has a pair of receiving pockets 54, 56, the corner 130 has a pair of grooves 140, 146. The corner 120 shown in FIG. 12 is slightly different than that shown in FIG. 11 due to the fact that it does not include second grooves 146.

The retaining walls 132, 133 are cantilevered from the end surfaces 64, 84 and spaced parallel to the base wall 50. The retaining walls 132, 133 are substantially reinforced by their connection to their corresponding corner walls 74, 94. The corner shown in FIGS. 11-14 all have cantilevered retaining walls 132, 133. The retaining walls 132, 133 extend from their respective end surfaces 64, 84 and the retaining walls terminate at corresponding inside surfaces 73, 93 of each respective corner wall 74, 94. Thus, the first retaining wall 132 extends from the first end surface 64 and spans from the inside surface 73 of the first corner wall 74 to lateral edge 138, and the second retaining wall 133 extends from the second end surface 84 and spans from the inside surface 93 of the second corner wall 94 to lateral edge 139.

It is understood that while certain aspects of the disclosed subject matter have been shown and described, the disclosed subject matter is not limited thereto and encompasses various other embodiments and aspects. No specific limitation with respect to the specific embodiments disclosed herein is intended or should be inferred. Modifications may be made to the disclosed subject matter as set forth in the following claims.

What is claimed is:

1. A flange corner comprising:
    a base wall with a first receiving pocket and a second receiving pocket;
    said first receiving pocket having a first inner lateral boundary wall extending perpendicularly from said base wall and a first outer lateral boundary wall extending perpendicularly from said base wall being spaced from and substantially parallel to said first inner lateral boundary wall, a first end surface extending perpendicularly from said base wall and being perpendicular to said first inner and said first outer lateral boundary walls and said first end surface spanning between said first inner lateral boundary wall and said first outer lateral boundary wall, a first retaining wall being spaced from and substantially parallel to said base wall, said first retaining wall being connected to said first end surface, said first retaining wall terminating between said first outer lateral boundary wall and said first inner lateral boundary wall, a first corner wall extending perpendicularly from said first retaining wall spaced from and located between said first inner and outer lateral boundary walls, said first end surface extending continuously from between said base wall and first retaining wall and said first end surface extending adjacently connected along said first corner wall and said first end surface being perpendicular to first said corner wall, said first end surface adjacent to said first corner wall terminating between said first inner and said first outer lateral boundary wall, said first receiving pocket being open between said first corner wall and said first inner lateral boundary wall;

second receiving pocket having a second inner lateral boundary wall extending perpendicularly from said base wall and a second outer lateral boundary wall extending perpendicularly from said base wall being spaced from and substantially parallel to said second inner lateral boundary wall, a second end surface extending perpendicularly from said base wall and being perpendicular to said second inner and said second outer lateral boundary walls and said second end surface spanning between said second inner lateral boundary wall and said second outer lateral boundary wall, a second retaining wall being spaced from and substantially parallel to said base wall, said second retaining wall being connected to said second end, said second retaining wall terminating between said second outer lateral boundary wall and said second inner lateral boundary wall, a second corner wall extending perpendicularly from said second retaining wall spaced from and located between said second inner and outer lateral boundary walls, said second end surface extending continuously from between said base wall and said second retaining wall and said second end surface extending adjacently connected along said second corner wall and said second end surface being perpendicular to said corner wall, said second end surface adjacent to said second corner wall terminating between said second inner and said second lateral boundary wall, said second receiving pocket being open between said second corner wall and said second inner lateral boundary wall;

said first receiving pocket orthogonally oriented with respect to said second receiving pocket, said base wall extending beyond said first and second receiving pockets and connecting said first and second receiving pockets.

2. The flange corner of claim 1, wherein said first and second corner walls being joined.

3. The flange corner of claim 1, wherein a portion of said base wall is a bridge section extending between said first and said second end surfaces, said bridge section having an outer perimeter surface aligned with an outer surface of said first and second outer lateral boundary walls, said first corner wall intersecting said second corner wall.

4. The flange corner of claim 1, wherein said first and second retaining walls include an outer lateral edge defining a terminal edge of said retaining walls, said outer lateral edges of said first and second retaining walls being spaced from said corresponding adjacent outer lateral boundary walls.

5. The flange corner of claim 4, wherein said first retaining wall terminates between said first outer lateral boundary wall and said first inner lateral boundary wall at a first inside surface of said first corner wall and said second retaining wall terminates between said second outer lateral boundary wall and said second inner lateral boundary wall at a second inside surface of said second corner wall.

6. The flange corner of claim 5, wherein said first retaining wall includes a first lateral outside edge opposite said first inside surface of said first corner wall and said second retaining wall includes a second lateral outside edge opposite said second inside surface of said second corner wall, said first lateral outside edge being spaced from said first outer lateral boundary wall to form a first groove and said second lateral outside edge being spaced from said second outer lateral boundary wall to form a second groove.

7. The flange corner of claim 1, wherein said corner walls are connected to said base wall opposite said corresponding receiving pockets and beyond said corresponding end surfaces.

8. A flange corner adapted to be affixed between a first and second elongate extrusion and be retained therebetween, said first and second elongate extrusion each having an outside wall with an outside facing surface and a sealing surface located opposite to said outside facing surface, said first and second elongate extrusions including and a mounting wall extending substantially perpendicularly from said outside wall, each said elongate extrusion having terminal ends, said flange corner comprising:

a base wall with a first receiving pocket and a second receiving pocket;

said first receiving pocket having a first inner lateral boundary wall extending perpendicularly from said base wall and a first outer lateral boundary wall extending perpendicularly from said base wall being spaced from and substantially parallel to said first inner lateral boundary wall, a first end surface extending perpendicularly from said base wall and being perpendicular to said first inner and said first outer lateral boundary walls and said first end surface spanning between said first inner lateral boundary wall and said first outer lateral boundary wall, a first retaining wall being spaced from and substantially parallel to said base wall, said first retaining wall being connected to said first end surface, said first retaining wall terminating between said first outer lateral boundary wall and said first inner lateral boundary wall, a first corner wall extending perpendicularly from said first retaining wall spaced from and located between said first inner and outer lateral boundary walls, said first end surface extending continuously from between said base wall and first retaining wall and said first end surface extending adjacently connected along said first corner wall and said first end surface being perpendicular to first said corner wall, said first end surface adjacent to said first corner wall terminating between said first inner and said first outer lateral boundary wall, said first receiving pocket being open between said first corner wall and said first inner lateral boundary wall, a portion of said first end surface between said first corner wall and said first inner lateral boundary wall in alignment with said sealing surface of one of said extrusions when said one extrusion is inserted in said first receiving pocket;

second receiving pocket having a second inner lateral boundary wall extending perpendicularly from said base wall and a second outer lateral boundary wall extending perpendicularly from said base wall being spaced from and substantially parallel to said second inner lateral boundary wall, a second end surface extending perpendicularly from said base wall and being perpendicular to said second inner and said second outer lateral boundary walls and said second end surface spanning between said second inner lateral boundary wall and said second outer lateral boundary wall, a second retaining wall being spaced from and substantially parallel to said base wall, said second retaining wall being connected to said second end surface, said second retaining wall terminating between said second outer lateral boundary wall and said second inner lateral boundary wall, a second corner wall extending perpendicularly from said second retaining wall spaced from and located between said second inner and outer lateral boundary walls, said second end surface extending continuously from between said base wall and said second retaining wall and said second end surface extending adjacently connected along said second corner wall and said second end surface being perpendicular to said corner wall, said second end surface adjacent to said second corner wall terminating between said second inner and said second lateral boundary wall, said second receiving pocket being open between said second corner wall and said second inner lateral boundary wall a portion of said second end surface between said second corner wall and said second inner lateral boundary wall in alignment with said sealing surface of another of said extrusions when said another extrusion is inserted in said first receiving pocket;

said first receiving pocket orthogonally oriented with respect to said second receiving pocket, said base wall extending beyond said first and second receiving pockets and connecting said first and second receiving pockets.

9. The flange corner of claim 8, wherein said inner lateral boundary walls align with said extrusions when said extrusions are within said first and second pockets.

10. The flange corner of claim 8, wherein surfaces adjacent inner lateral walls and said end surfaces align with said sealing surfaces of said extrusions when said extrusions are located within said receiving pockets.

\* \* \* \* \*